United States Patent
Choque et al.

(10) Patent No.: US 10,643,122 B1
(45) Date of Patent: May 5, 2020

(54) SYSTEMS USING HASH KEYS TO PRESERVE PRIVACY ACROSS MULTIPLE TASKS

(71) Applicant: Capital One Services, LLC, McLean, VA (US)

(72) Inventors: Omar Florez Choque, McLean, VA (US); Erik Mueller, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/404,169

(22) Filed: May 6, 2019

(51) Int. Cl.
*G06N 3/04* (2006.01)
*G06N 3/08* (2006.01)
*G06N 20/00* (2019.01)
*G06N 3/02* (2006.01)
*G06N 20/10* (2019.01)

(52) U.S. Cl.
CPC .............. *G06N 3/0454* (2013.01); *G06N 3/08* (2013.01); *G06N 3/02* (2013.01); *G06N 3/0481* (2013.01); *G06N 20/00* (2019.01); *G06N 20/10* (2019.01)

(58) Field of Classification Search
CPC ...... G06N 3/02; G06N 3/0454; G06N 3/0481; G06N 3/08; G06N 20/00; G06N 20/10; G06N 20/20
USPC ................................................ 711/16, 17, 25
See application file for complete search history.

(56) References Cited

U.S. PATENT DOCUMENTS

| | | | |
|---|---|---|---|
| 6,647,377 B2 | 11/2003 | Jannarone | |
| 8,234,228 B2 | 7/2012 | Weston et al. | |
| 8,504,361 B2 | 8/2013 | Collobert et al. | |
| 10,089,576 B2 | 10/2018 | Gao et al. | |
| 2013/0114811 A1* | 5/2013 | Boufounos | H04K 1/00 380/255 |

(Continued)

FOREIGN PATENT DOCUMENTS

| | | |
|---|---|---|
| CN | 103345656 | 1/2016 |
| CN | 106462626 | 2/2017 |

OTHER PUBLICATIONS

Qiu et al., Privacy and Quality Preserving Multimedia Data Aggregation for Participatory Sensing Systems, IEEE Transactions on Mobile Computing, vol. 14, No. 6, pp. 1287-1300, Jun. 2015 (Year: 2015).*

(Continued)

*Primary Examiner* — Shane D Woolwine
(74) *Attorney, Agent, or Firm* — Troutman Sanders LLP; Christopher J. Forstner; John A. Morrissett

(57) ABSTRACT

A system for using hash keys to preserve privacy across multiple tasks is disclosed. The system may provide training batch(es) of input observations each having a customer request and stored task to an encoder, and assign a hash key(s) to each of the stored tasks. The system may provide a new batch of input observations with a new customer request and new task to the encoder. The encoder may generate a new hash key assigned to the new customer request and determine whether any existing hash key corresponds with the new hash key. If so, the system may associate the new batch of input observations with the corresponding hash key and update the corresponding hash key such that it is also configured to provide access to the new batch of input observations. If not, the system may generate a new stored task and assign the new hash key to it.

23 Claims, 6 Drawing Sheets

(56) References Cited

U.S. PATENT DOCUMENTS

2018/0174037 A1* 6/2018 Henry ............... G06N 3/08
2018/0357537 A1* 12/2018 Munkberg ......... G06N 3/084

OTHER PUBLICATIONS

Bahdanau, D. et al., Neural Machine Translation by Jointly Learning to Align and Translate, ICLR 2015; May 19, 2016.

Goodfellow, I. et al., Generative Adversarial Nets, Department d'informatique et de recherche operationnelle, Universite de Montreal; Jun. 10, 2014.

Ioffe, S. et al., Batch Normalization: Accelerating Deep Network Training by Reducing Internal Covariate Shift; Mar. 2, 2015.

Johnson, M. et al., Google's Multilingual Neural Machine Translation System: Enabling Zero-Shot Translation; Aug. 21, 2017.

Kaiser, L. et al., Learning to Remember Rare Events, ICLR 2017; Mar. 9, 2017.

Kingman, D. et al., Adam: A Method for Stochastic Optimization, ICLR 2015; Jan. 30, 2017.

Kirkpatrick, J. et al., Overcoming catastrophic forgetting in neural networks, DeepMind, London, UK, Bioengineering Depoartment, imperial College London; Jan. 25, 2017.

Koch, G. et al., Siamese Neural Networks for One-shot Image Recognition, Department of Computer Science, University of Toronto; 2015.

Krizhevsky, A. et al., ImageNet Classification with Deep Convolutional Neural Networks; Jun. 2017.

Lake, B. et al, One shot learning of simple visual concepts, Department of Brain and Cognitive Sciences, Massachusetts Institute of Technology; 2011.

Mnih, V. et al., Asynchronus Methods for Deep Reinforcement Learning; Jun. 16, 2016.

Pauleve, L. et al., Locality sensitive hashing: a comparison of has function types and querying mechanisms, HAL archives-ouvertes; Apr. 16, 2010.

Qian, N., On the Momentum Term in Gradient Descent Learning Algorithms, Neural Networks; Jan. 1999.

Qian, Q. et al., Distance Metric Learning Using Dropout: A Structured Regularization Approach, KDD '14 Proceedings of the 20th ACM SIGKDD international conference on Knowledge discovery and data mining, Aug. 2014.

Santoro, A. et al., Meta-Learning with Memory-Augmented Neural Networks, ICML'16 Proceedings of the 33rd International Conference on International Conference on Machine Learning—vol. 48, pp. 1842-1850; Jun. 2016.

Vinyals, O. et al., Matching Networks for One Shot Learning, NIPS'16 Proceedings of the 30th International Conference on Neural Information Processing Systems, pp. 3637-3645; Dec. 2016.

Wei, Z. et al., Reinforcement Learning to Rank with Markov Decision Process, SIGIR'17; Aug. 2017.

Williams, R. et al., Simple Statistical Gradient-Following Algorithms for Connectionist Reinforcement Learning, Machine Learning, 8, pp. 229-256; 1992.

Zhu, S. et al., Multi-labelled Classification Using Maximum Entropy Method, SIGIR'05; Aug. 2005.

* cited by examiner

Left: CMU dataset Right: CIFAR10 dataset.

SYSTEMS USING HASH KEYS TO PRESERVE PRIVACY ACROSS MULTIPLE TASKS

The present disclosure relates generally to systems implementing a computer model for generating and assigning hash keys to a plurality of tasks, and more specifically to systems for controlling hash key assignments to particular tasks in order to limit access to information associated with those tasks and, in turn, prevent deep embedding attacks.

BACKGROUND

Deep neural networks are effective models for solving complex supervised problems with high accuracy for several types of unstructured datasets, such as images, videos, and text. In scenarios with limited resources (e.g., smartphones, smartwatches, etc.), it is a common practice to bootstrap the training step by reusing pre-trained neural networks. This technique is known as fine-tuning. While systems employing fine-tuning can be efficient, they are susceptible to significant attacks because an attacker who obtains access to the trained model itself has full access to personal attributes or other confidential data contained on or accessible by the model. Such systems sometimes attempt to limit this susceptibility by adding noise to the input space or employing an API interface in hopes that any attacker would only have access to the API rather than the embedding vectors and data of the model itself, though these techniques are not always effective. Other systems employ several models so that an attack on a single model does not compromise data across the entire system, but such systems are typically less efficient and/or accurate than systems that employ a single model capable of executing the same tasks.

Accordingly, there is a need for improved devices, systems, and methods that can execute multiple tasks in the same model without exposing all information contained on or accessible by the model during an attack. The disclosed systems and methods for using hash keys to preserve privacy across multiple tasks are directed to these and other considerations.

SUMMARY

Disclosed embodiments provide systems and methods for controlling hash key assignments to particular tasks in order to limit access to information associated with those tasks and, in turn, prevent deep embedding attacks. To accomplish this, in some embodiments, such systems simultaneously train an encoder and generate or assign a task-specific set of hash keys to implement a deep sharing neural network. As a consequence, developers need only share keys that are required to infer predictions on specific tasks rather than forcing them to give full control of the pre-trained encoder.

Consistent with the disclosed embodiments, the disclosed technology may include a system for using hash keys to preserve privacy across multiple tasks in a neural network. In one aspect, the system may include one or more processors and memory storing instructions that, when executed by the one or more processors, are configured to cause the system to perform various functions. For example, the system may provide one or more training batches of input observations (e.g., historical data related to interactions with a customer) for one or more stored tasks (e.g., extrapolating information regarding the customer, such as age, gender, income, or marital status) to an encoder. Each of the one or more training batches of input observations may include a customer request (e.g., a request to open an account via a support hotline) and a stored task (e.g., income data about the customer) associated with the customer request. The system may assign a hash key of a plurality of hash keys to each of the one or more stored tasks. At some point (e.g., when a customer inquires about an automobile loan), the system may provide a new batch of input observations including a new customer request (e.g., a loan request for a particular automobile) and one or more new tasks (e.g., determining whether the customer is 25 or older, determining whether the customer has a loan for another automobile, etc.) associated with the new customer request to the encoder. Using the encoder, the system may generate a new hash key assigned to the new customer request and determine whether the new hash key assigned to the new customer request corresponds with (e.g., matches beyond a predetermined confidence threshold) at least one hash key of the plurality of hash keys. If the system determines that the new hash key does not correspond with at least one of the hash key(s), it may generate a new stored task associated with the new batch of input observations and assigns the new hash key to the new stored task. Or, if the system determines that the new hash key corresponds with at least one of the hash key(s), it may associate the new batch of input observations with a first training batch of input observations associated with the corresponding hash key and update the corresponding hash key such that it is configured to provide access to the new batch of input observations and the first training batch of input observations.

In another aspect, the disclosed technology may also include a system having one or more processors and memory storing instructions that, when executed by the one or more processors, are configured to cause the system to perform various functions. For example, the system may obtain historical data associated with a first customer of a plurality of customers based on a first customer request (e.g., a customer contacting a customer service chatbot to request a personal loan) from the first customer. The system may then train an encoder using the historical data associated with the first customer. The encoder may have a plurality of existing tasks, with each task (e.g., determining one or more of age, gender, income and marital status of the customer) assigned with one or more existing hash keys. Further, each of the one or more existing hash keys may permit access to information associated with the existing task to which the respective hash key is assigned. Via the encoder, the system may generate at least a first customer request task based on the first customer request (e.g., the system may like to know a current savings balance of the customer) and determine whether the first customer request task corresponds with any of the existing tasks (e.g. the system may determine whether it has received or extrapolated any balances of the customer, including savings, checking, or retirement). If so, the system may update a first existing hash key assigned to the first existing task such that the updated first existing hash key permits access to information associated with the first customer request on the encoder. If not, it may add the first customer request task as a new existing task and randomly assign a new hash key, from available hash key entries, to the new existing task. This new hash key permits access to information associated with the new existing task on the encoder.

In yet another aspect, the disclosed technology may also include a method for using hash keys to preserve privacy across multiple tasks by performing various steps. For example, the method may obtain first customer data associated with a first customer of a plurality of customers based on a first customer request (e.g., a customer may dial into a call center where voice samples are recorded containing the customer's desire to purchase a certificate of deposit) from the first customer. The method may then train a convolution neural network (CNN) model using the first customer data. The CNN model may have a plurality of existing tasks including a first existing task (e.g., the customer may have previously called in to obtain a personal loan, and income information may have been recorded) and a second existing task (e.g., on another occasion the customer may have initated conversation with a chatbot to diagnose a login malfunction, and the customer may have provided their physical location or device information), and a plurality of existing hash keys. The existing hash keys may include a first existing hash key and a second existing hash key. Further, the first and second existing hash keys may be assigned to the first and second existing tasks, respectively, and be configured to permit access to stored information associated with the first and second existing tasks, respectively. Next, the method may include using the CNN model to generate at least a first customer request task (e.g., the system might like to know a savings balance before quoting an interest rate) based on the first customer request and determine whether the first customer request task matches, above a predetermined confidence threshold, any of the existing tasks (e.g. the system may determine whether is has previously received or extrapolated account balance information for savings, checking, or retirement accounts). If so, the method may include associating the first customer request task with the first existing task (e.g., that matches the first customer request task) such that the first existing hash key is configured to allow access to information associated with the first customer request via the CNN model (e.g. savings, checking, and retirement balance information). If not, it may include adding the first customer request task to the plurality of existing tasks and randomly generating and assigning a new hash key to the first customer request task. The new hash key may permit access to information associated with the first customer request task via the CNN model.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
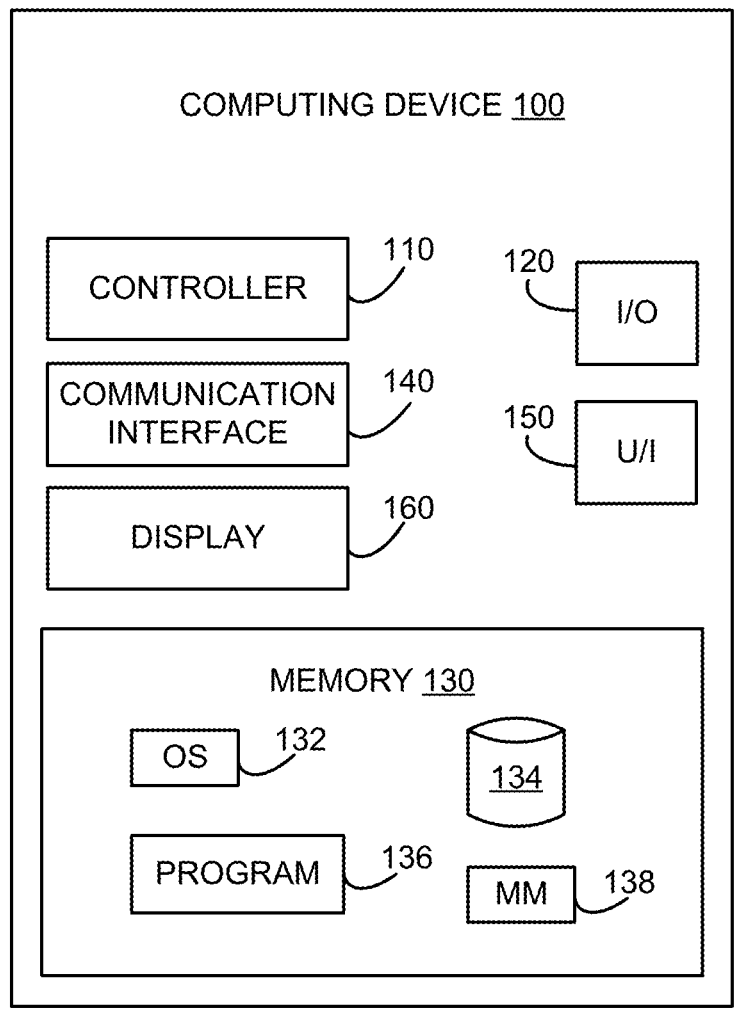
FIG. 1 is a component diagram of an example computing device, in accordance with some embodiments.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although various embodiments may be described with respect to a system, a non-transitory computer-readable medium, and a method, it is contemplated that embodiments with identical or substantially similar features may alternatively be implemented as methods, systems, and/or non-transitory computer-readable media.

According to one aspect of the disclosed technology, a a system for using hash keys to preserve privacy across multiple tasks is disclosed. The system may include one or more processors and memory storing instructions that, when executed by the one or more processors, are configured to cause the system to perform various functions. For example, the system may provide, to an encoder, one or more training batches of input observations for one or more stored tasks, each of the one or more training batches of input observations including a customer request and a stored task associated with the customer request. The system may assign a hash key of a plurality of hash keys to each of the one or more stored tasks. Also, the system may provide to the encoder a new batch of input observations including a new customer request and a new task associated with the new customer request. Using the encoder, the system may generate a new hash key assigned to the new customer request and determine whether the new hash key assigned to the new customer request matches, beyond a predetermined confidence threshold, at least one hash key of the plurality of hash keys. If the system determines that the new hash key does not match at least one hash key of the plurality of hash keys beyond the predetermined confidence threshold, it may generate a new stored task associated with the new batch of input observations and assigns the new hash key to the new stored task. Or, if the system determines that the new hash key matches at least one hash key of the plurality of hash keys beyond the predetermined confidence threshold, it may associate the new batch of input observations with a first training batch of input observations associated with the matched hash key and update the matched hash key such that the matched hash key is configured to provide access to the new batch of input observations and the first training batch of input observations.

In some embodiments, the system may compute a sparse collection of gradients to update at least one value of the following values: at least one task of the one or more stored tasks, and at least one hash key of the plurality of hash keys. In various embodiments, the technology may retrieve at least one hash key of the plurality of hash keys that both (1) exceeds a predetermined similarity threshold relative to the first customer request, and (2) belongs to a same stored task of the one or more stored tasks. In some embodiments, the system may store, using the encoder, the one or more stored tasks and the plurality of hash keys to a single neural network using an objective function. Additionally, in various embodiments, the system may store, using a single neural network, the one or more stored tasks by assigning each task of the one or more stored tasks to independent inference units. Also, according to one or more embodiments, the encoder may include a convolution neural network (CNN) encoder.

According to another aspect of the disclosed technology, a system may be have one or more processors and memory storing instructions that, when executed by the one or more processors, are configured to cause the system to perform other various functions. For example, the system may obtain historical data associated with a first customer of a plurality of customers based on a first customer request from the first customer, and then train an encoder using the historical data associated with the first customer. The encoder may have a plurality of existing tasks, with each task being assigned one or more existing hash keys. Further, each of the one or more existing hash keys may permit access to information associated with the existing task to which the respective hash key is assigned. Via the encoder, the system may generate at least a first customer request task based on the first customer request and determine whether the first customer request task corresponds with any existing task of the plurality of existing tasks. If the system determines that the first customer request task does not correspond with any of the existing tasks, it may add the first customer request task as a new existing task and randomly assign a new hash key to the new existing task. This new hash key permits access to information associated with the new existing task on the encoder. Or, responsive to determining that the first customer request task corresponds with at least a first existing task of the existing tasks, the system may update a first existing hash key assigned to the first existing task such that the updated first existing hash key permits access to information associated with the first customer request on the encoder.

In some embodiments, updating the first existing hash key may include updating the first existing hash key using an embedding vector. In various embodiments, the technology may compute a sparse collection of gradients to update at least one value of the following values: at least one task of the plurality of existing tasks, and at least one existing hash key of the one or more existing hash keys. Further, in some embodiments, the system may retrieve at least one hash key of the one or more existing hash keys that both (1) exceeds a predetermined similarity threshold relative to the first customer request, and (2) belongs to a same existing task of the plurality of existing tasks. Additionally, in various embodiments, the system may store, using the encoder, the plurality of existing tasks and the assigned one or more existing hash keys to a single neural network using an objective function. Also, according to one or more embodiments, the system may store, using a single neural network, the plurality of existing tasks by assigning each task of the plurality of existing tasks to independent inference units. Finally, according to one or more embodiments, the encoder may include a convolution neural network (CNN) encoder.

According to another aspect of the disclosed technology, a method for using hash keys to preserve privacy across multiple tasks may also be disclosed. For example, the method may obtain first customer data associated with a first customer of a plurality of customers based on a first customer request from the first customer. The method may train a CNN model using the first customer data. The CNN model may have a plurality of existing tasks including a first existing task and a second existing task, and a plurality of existing hash keys. The existing hash keys may include a first existing hash key and a second existing hash key. Further, the first and second existing hash keys may be assigned to the first and second existing tasks, respectively, and be configured to permit access to stored information associated with the first and second existing tasks, respectively. The method may also include using the CNN model to generate at least a first customer request task based on the first customer request, and determining whether the first customer request task matches, above a predetermined confidence threshold, any existing task of the plurality of existing tasks. If it is determined that the first customer request task does not match any existing task of the plurality of existing tasks beyond the predetermined confidence threshold, the method may include adding the first customer request task to the plurality of existing tasks and randomly generating and assigning a new hash key to the first customer request task. The new hash key may permit access to information associated with the first customer request task via the CNN model. Or, responsive to determining that the first customer request task matches the first existing task beyond the predetermined confidence threshold, the method may include associating the first customer request task with the first existing task such that the first existing hash key is configured to allow access to information associated with the first customer request via the CNN model.

In some embodiments, training the CNN model may further include training the CNN model using an embedding vector. Further, in some embodiments, the method may include computing a sparse collection of gradients to update at least one value of the following values: at least one task of the plurality of existing tasks, and at least one existing hash key of the one or more existing hash keys. Additionally, in various embodiments, computing the sparse collection of gradients to update the at least one value further includes: retrieving at least one existing hash key of the one or more existing hash keys that both (1) exhibits a threshold level of similarity with an embedding vector of the CNN model, and (2) belongs to a same existing task of the plurality of existing tasks. Also, according to one or more embodiments, the method may include storing, using the encoder, the plurality of existing tasks and the one or more existing hash keys to a single neural network using an objective function. In one or more embodiments, the CNN model includes a single neural network that stores, via the CNN model, the plurality of existing tasks by assigning each task of the plurality of existing tasks to independent inference units. Finally, according to one or more embodiments, the method may include determining, via the CNN model, the predetermined confidence threshold based on the first customer request task Reference will now be made in detail to example embodiments of the disclosed technology, examples of which are illustrated in the accompanying drawings and disclosed herein. Wherever convenient, the same references numbers will be used throughout the drawings to refer to the same or like parts.

Figure 2:
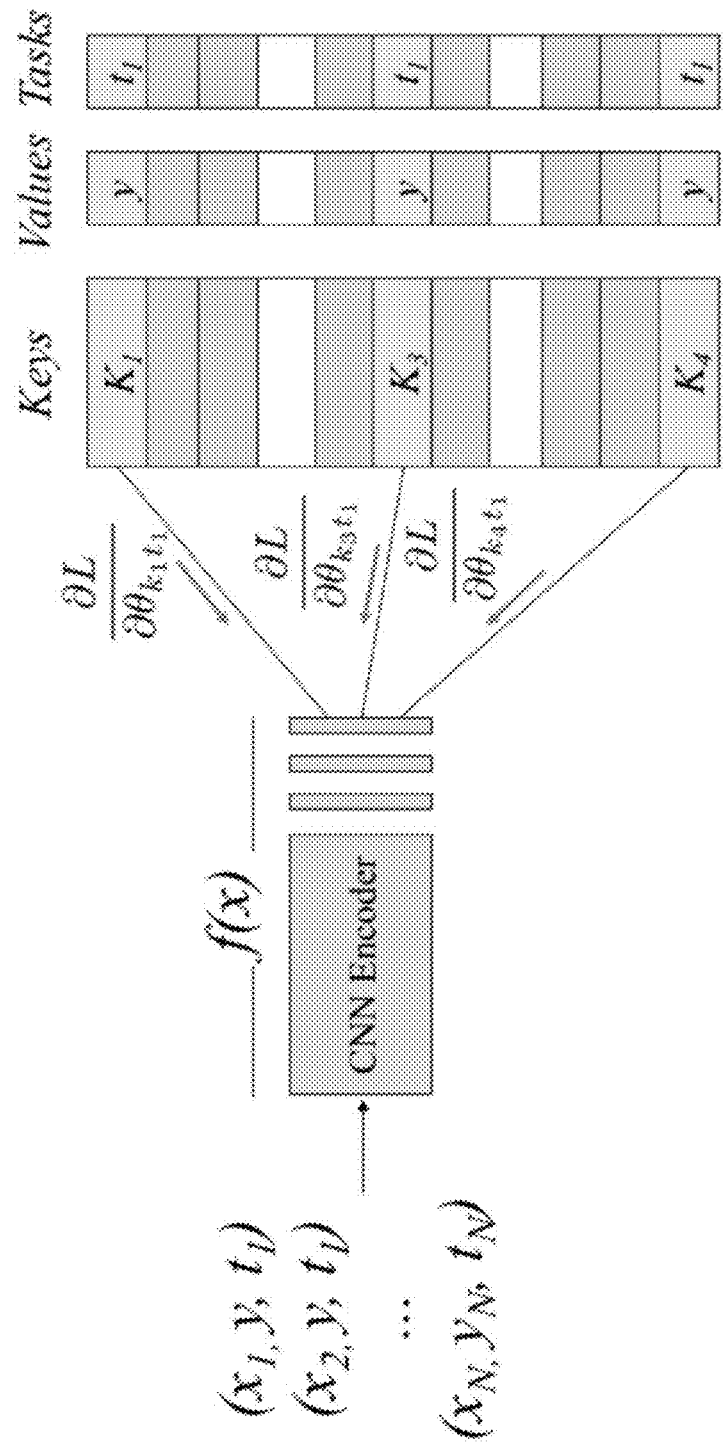
FIG. 2 is a representation of an example neural network architecture, in accordance with some embodiments.

FIG. 1 shows an example embodiment of a computing device 100 configured to implement the system of FIG. 2 and one or more methods disclosed herein. As shown, computing device 100 may include a controller 110 (e.g., one or more processors), an input/output (I/O) device 120, a memory 130, which may contain an operating system (OS) 132, a storage device 134, which may be any suitable repository of data and which may include memory module 220, a program 136, and a communication interface 140. In some embodiments, communication interface 140 may include a transceiver (not shown). In certain embodiments, computing device 100 may include a user interface (U/I) device 150 for receiving user input data, such as data representative of a click, a scroll, a tap, a press, or typing on an input device that can detect tactile inputs. In some embodiments, computing device 100 can additionally include a display 160.

In some embodiments, computing device 100 may include a peripheral interface, which may include the hardware, firmware, and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, Bluetooth™ low-energy (BLE) (e.g., BLE mesh and/or thread), Wi-Fi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows controller 110 to communicate with other devices via wired or wireless networks, whether local or wide area, private or public. A power source may be configured to provide an appropriate alternating current (AC) or direct current (DC) to power components.

Controller 110 may include one or more of an application specific integrated circuit (ASIC), programmable logic device, microprocessor, microcontroller, digital signal processor, co-processor or the like or combinations thereof capable of executing stored instructions and operating upon stored data. Memory 130 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including operating system 132, application programs 136 (including, for example, a web browser application, a widget or gadget engine, and or other applications, as necessary), executable instructions and data. In some embodiments, controller 110 may include a secure microcontroller, which may be configured to transmit and/or facilitate secure lines of communication. In some embodiments, some or all of the processing techniques described herein can be implemented as a combination of executable instructions and data within memory 130.

Controller 110 may be one or more known processing devices, such as a microprocessor from the Pentium™ family manufactured by Intel™, the Turion™ family manufactured by AMD™, or the Cortex™ family or SecurCore™ manufactured by ARM™. Processor 101 may constitute a single-core or multiple-core processor that executes parallel processes simultaneously. For example, controller 110 may be a single core processor that is configured with virtual processing technologies. In certain embodiments, controller 110 may use logical processors to simultaneously execute and control multiple processes. Controller 110 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Computing device 100 may include one or more storage devices 134 configured to store information used by controller 110 (or other components) to perform certain functions related to the disclosed embodiments. As an example, computing device 100 may include memory 130 that includes instructions to enable controller 110 to execute one or more applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, computing device 100 may include memory 130 that includes instructions that, when executed by controller 110, perform one or more processes consistent with the functionalities disclosed herein. Methods, systems, and articles of manufacture consistent with disclosed embodiments are not limited to separate programs or computers configured to perform dedicated tasks.

Memory 130 may include one or more memory devices that store data and instructions used to perform one or more features of the disclosed embodiments. Memory 130 may also include any combination of one or more databases controlled by memory controller devices (e.g., one or more servers, etc.) or software, such as document management systems, Microsoft™ SQL databases, SharePoint™ databases, Oracle™ databases, Sybase™ databases, or other relational databases. Memory 130 may include software components that, when executed by controller 110, perform one or more processes consistent with the disclosed embodiments. In some embodiments, memory 130 may include a memory module (MM) 138 consistent with the disclosed embodiments.

Computing device 100 may also be communicatively connected to one or more memory devices (e.g., databases (not shown)) locally or through a network. The remote memory devices may be configured to store information and may be accessed and/or managed by computing device 100.

By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

In example embodiments of the disclosed technology, computing device 100 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While computing device 100 has been described as one form for implementing the techniques described herein, those having ordinary skill in the art will appreciate that other functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of computing device 100 may include a greater or lesser number of components than those illustrated. Some embodiments may exclude certain components discussed herein.

Although the preceding description describes various functions of computing device 100 and particularly controller 110, in some embodiments, some or all of these functions may be carried out by multiple computing devices. For example, in some embodiments, some or all of the functionalities of controller 110 and/or computing device 100 may be carried out by a remote computing device (not shown) or another component included in computing device 100 that is separate and distinct from controller 110, such as an encoder or a different processor, for example.

FIG. 2 shows one embodiment of a deep learning neural network (also referred to herein as deep sharing model). The components of the network or model may include one or more of: an encoder, hash keys, values, and task indices. This architecture has the advantage of generating a common encoder across tasks enabling the reuse of features learned during training, and can also generate different task-related hash keys simultaneously. For example, in a customer databbse of a service provider's network, raw signals included in a batch of input observations about a customer may include data streams obtained while the customer was interfacing with a customer service system. In some embodiments, including in the above-noted example, the raw signals may include voice samples, text samples, form responses, or more that were recorded about a customer as they interacted with the customer service system. The tasks included in a given batch of input observations can include any objective that is desired to be calculated by the deep learning neural network. For example, when given a set of observations about a customer, the service provider may want to extrapolate additional data about the customer such as age, gender, location, income, marital status, and the like. A class label may be assigned in order to group related tasks based on an overall purpose, such as tasks related to selling a customer an auto loan or to assigning the customer to an appropriate service representative based on his or her request.

In the neural network, given T tasks, the system (e.g., via computing device 100) may learn T classifiers by training an encoder and T sets of hash keys from a batch of input observations (x, y, t) for T tasks, where x is a raw signal, y is a class label, and t is a task index. The encoder may map x to the embedding vector f(x) and compare its similarity with each available key from task t, $f(x) \cdot K_i^t$.

In one embodiment, an embedding vector may be a collection of numbers that represents the input x into a mathematical space, which is accomplished by consecutively mapping the input x into the hidden layers of a neural network, f. This operation may be expressed as f(x). We may consider many types of neural networks as alternative encoders that generate embedding vectors. In one embodiment, an embedding vector is a mapping of a discrete, categorical, variable to a vector of continuous numbers. In the context of neural networks, embeddings may be low-dimensional, learned continuous vector representations of discrete variables. Neural network embeddings may be useful because they can reduce the dimensionality of categorical variables and meaningfully represent categories in the transformed space. Neural network embeddings may be able to find nearest neighbors in the embedding space, which can be used to make recommendations based on user interests, cluster, or task categories.

Returning to FIG. 2, in one embodiment, when given a new batch of input observations, the system may desire to identify any correlation between the new batch of input observerations an any existing batches of input observations. When no such correlation is identified (e.g., the results of mapping the input observations to an embedding vector f(x) does not match any hash key from the actual label y beyond a predetermined confidence threshold) the actual label y, a new task associated with the new batch of input observations f(x) is assigned as a new hash key entry if one is available. In one embodiment it may be the case that a correlation is identified beyond a predetermined confidence threshold by random chance (e.g., the results of mapping the input observations to an embedding vector f(x) does match a hash key from the actual label y beyond a predetermined confidence threshold, even in situations where subjective analysis shows that there should be no association between the input observations and the matched hash key). However, since every x is assumed to be independent of each other, multiple versions of x that are not correlated will fix this issue and generate valid gradients during the training state and thus enable learning of correct parameters (neural network weights). Further, in various embodiments, the predetermined confidence threshold may be adjusted up to provide less correlations between subjectively unassociated observations and hash keys (at the expense of creating more hash keys), or, predetermined confidence threshold may be adjusted down to provide fewer required hash keys (at the expense of having more correlations between subjectively unassociated observations and hash keys).

Regarding hash key entries, in various embodiments, the neural network may keep existing and available entries as resources allow. In one embodiment, when resources are limited, the absence of an available entry may cause the system to erase the oldest entry in order to make room for one or more new entries. In another embodiment, the system may erase the least used entry to free resources as needed. In a further embodiment, the system may erase the least valuable entry. In yet another embodiment, there is no limit to resources and available entries are unlimited. Alternatively, when the encoder maps x to the embedding vector f(x) and compares its similarity with each available key from task t, $f(x) \cdot K_i^t$, it may find a match, beyond a predetermined confidence threshold, between the new input observation and an existing key. In this instance, the system may update the one or more matching existing keys using the function $$K_i^t := \frac{K_i^t + f(x)}{|K_i^t + f(x)|}.$$

This model may be designed to encourage updates coming from hash keys assigned to the same task while maximizing the distance between hash keys assigned to different tasks. During backpropagation, the model may only compute a sparse collection of gradients to update the trainable parameters. To do this, the deep learning neural network may only retrieve the one or more hash keys that correspond with (e.g., exhibit high similarities to) the embedding vector f(x), and belong to the same task index t. Such a sparse update mechanism is critical to enable the learning of multiple tasks in the same model. According to this mechanism, when input observations insufficiently correlate with existing entries according to the embedding vector, the system is biased towards creating a new entry with a new set of hash keys. Since hash keys provide access to all observations that are related by a given task and classification, such a discerning system prevents hackers from generating false observations and downloading unauthorized data from unrelated observations. Further, when third party developers that are assigned to update the model according to a given task and classification, they will be unable to access other parts of the model that relate to different tasks and classifications. Such a system allows a purely monolithic neural network to learn various tasks and classifications, yet provide security between entities that are assigned to update the different tasks and classifications. The system designer may tune the selectivity of the neural network by adjusting the gradients to be more or less sparse, where more sparse gradients provide greater security at the cost of resources, while less sparse gradients provide less security with the use of fewer resources. Regarding the gradients, a further result of the system may include a maximum margin classifier that aims to minimize the following objective function:

$$L(f(x), y, t) = \max\left(0, f - (x) \cdot K_+^j + \frac{\sum_{j=1}^{T} f(x) \cdot K_-^j}{M} + \alpha\right).$$

For example, as shown in FIG. 2 and in the objective function above, in order to provide maximum distance between keys, a margin factor alpha ($\alpha$) (e.g., maximum margin) is used to modulate the collection of gradients to be more or less sparse. In some embodiments, the objective function may be referred to as a loss function, which may drive the logic of the training step. The model may generate embedding vectors whose keys will satisfy the function's logic. Positive keys K+ represent the keys that share the same class label as y. Negative keys are the keys that have a different class label than y. The function may aim to create positive and negative keys that are generated during training by a marging of $\alpha$. In a case that the second part of function max is less than zero, the max function just returns 0, so $\alpha$ may account for the maximum margin allow during training.

Figures 3, 4:
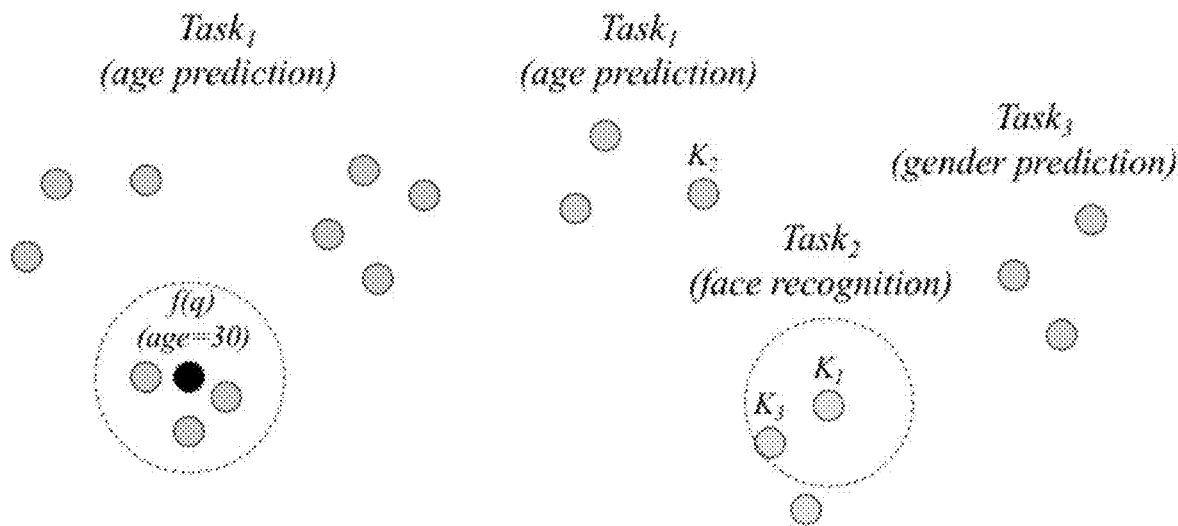
FIG. 3 is a representation of an example data set, in accordance with some embodiments.
FIG. 4 is representation of another example data set, in accordance with some embodiments.

FIG. 3 depicts an example of a legacy, single task network on the left, and one embodiment of a neural network supporting multiple tasks and multiple keys on the right. On the right side, the separate collections of points represent batches of input observations that correlate closely according to the embedding function, and thus they share a set of hash keys. The circumference of the circle around task 2 (face recognition) can depict the sparseness of the collection of gradients as modulated by the margin factor alpha ($\alpha$) The tighter the circle, the sparser the gradient. This embodiment allows a set of keys to be shared with third party developers only responsible for updating the network with regards to a specific task. Any tasks that the third party developer is not assigned to will be inaccessible and secure.

FIG. 4 shows an example of two separate datasets, CMU (facial recognition) and CIFAR10 (object recognition), when applied to an embodiment of the multiple task neural network. In each of the datasets, the grid shows how well input tasks correspond to actual tasks to which they are compared. In both examples, the embedding vector finds high correlation (close to 100) with related tasks, and low correlation (less than 30) with unrelated tasks. The closeness of this relationship may be adjusted by modulating the margin factor alpha ($\alpha$).

Since hash keys may be $l_2$ normalized, the loss function may maximize the cosine similarity between the embedding vector f(x) and true positive matching keys $K_+$ (i.e., k-nearest keys which values match class label y and task index t). Similarly, in one embodiment the model may minimize the similarity between f(x) and true negative keys $K_-$. (i.e., k-nearest keys that seems to be similar but have different class labels y and task t). In one embodiment, the model controls how far apart one task is with respect to another in the average case using the margin factor $\alpha=0.2$. In one embodiment, the loss function may compute a similarity between two vectors (an embedding vector f(x) and positive or negative keys) via Cosine distance, which value is between 0-1. A value of 1 may indicate a high similarity.

Figure 5:
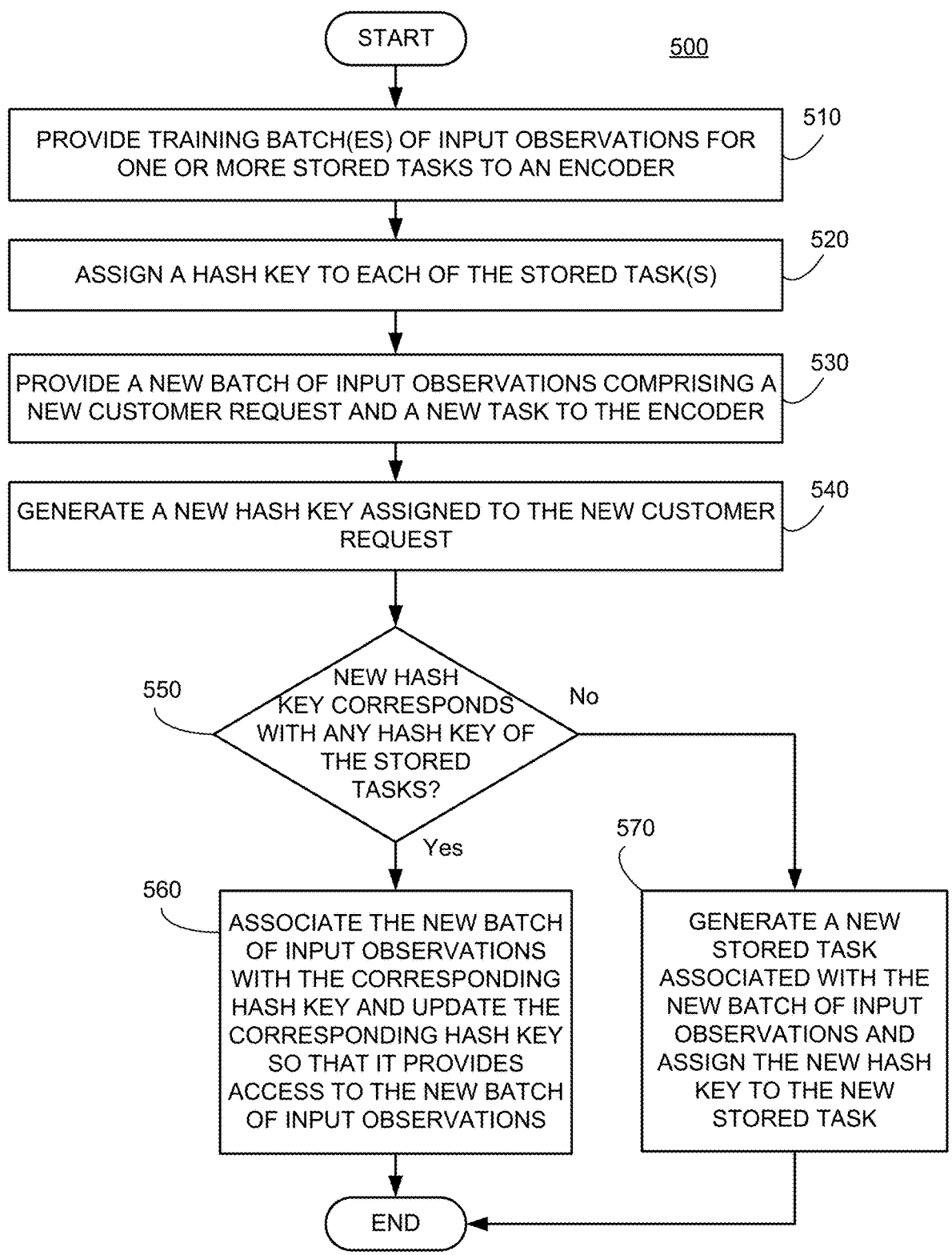
FIG. 5 is a flowchart showing operation of a first example system including a neural network using hash keys, in accordance with some embodiments.

FIG. 5 shows a flowchart of a method 500 according to an example embodiment. Method 500 may be performed by controller 110 and/or other components of computing device 100 alone or in cooperation with one or more other devices or systems. In block 510, the method 600 may include providing one or more training batches of input observations (e.g., customer voice samples, text samples, or form selections) for one or more stored tasks (e.g., selling a customer an auto loan, or assigning a customer a service representative) to an encoder. Each of the one or more training batches of input observations may include a customer request (e.g., the customer calls phone tech support center, initiates a chat with an online sales representative, or fills out a form at a local branch location) and a stored task (e.g., the customer requests a quote for a home loan) associated with the customer request.

In block 520, the method 500 may assign a hash key of a plurality of hash keys to each of the one or more stored tasks. For example, mutually exclusive hash keys are assigned to each desired task in order to provide security between tasks and allow privacy between developers assigned to different tasks. For example, the system may generate embedding vectors as f(x), where f is a neural network and x is its input, for every input x. An embedding vector will update the set of positive keys (similar keys pointing to same class labels y), which had initially all zeros or random values. This means that the training step may incrementally create new keys and update old ones while it is learning to increase the probability of finding positive keys.

In block 530, the method 500 may include providing a new batch of input observations to the encoder. The new batch of input observations may include a new customer request (e.g., a customer dials into a support hotline) and a new task (e.g., creating a new account for the customer) associated with the new customer request. In one embodiment, a new batch of input observations may be a random set of inputs chosen for the training step In block 540, the method 500 may include generating, via the encoder, a new hash key assigned to the new customer request. For example, the system may use the embedding vector to calculate a temporary new key in order to compare the results with existing keys. As discussed below, this temporary new key may be used to create a new entry or update existing keys based on the comparison. In one embodiment, generating a new hash key is just an embedding vector f(x) passing through the neural network f, and it may comprise one hash key for each observation, which may only occur if no similar hash key was found with same label and task.

In block 550, the method 500 may include determining, via the encoder, whether the new hash key assigned to the new customer request corresponds with (e.g., matches beyond a predetermined confidence threshold), and in concert with the selection of the margin factor alpha (α), at least one hash key of the plurality of pre-existing hash keys. If so (i.e., the result of block 550 is yes), then in block 560, the method 500 may include associating the new batch of input observations with a first training batch of input observations associated with the corresponding hash key, and updating the corresponding hash key such that it is configured to provide access to the new batch of input observations and the first training batch of input observations. If not (i.e., the result of block 550 is no), then in block 570, the method 500 may include generating a new stored task associated with the new batch of input observations and assigning the new hash key to the new stored task. In one embodiment, a set of possible tasks are obtained from training data directly (e.g., we may know in advance how many tasks will be learned). As shown in the illustrative and non-limiting example of FIG. 5, when a new customer request is received including a raw data signal x, task t, and class y, the neural network may be able to embed that customer request either with existing batches of input observations, or with a new entry and a new key for that entry in the network. In one embodiment, even if it is slow, a reduction of the loss functioned described above may modify the encoder and hash keys such that similarities will be closer to 100% during later training steps. Further, all of the keys in the neighborhood of K hash keys and that share the same class label y may be considered as matching keys. A benefit of this system is that unauthorized actors are not permitted to gain access to keys and tasks that are outside of their assigned range. In other words, the system may map embedding vectors to a new space that is shared by multiple tasks t (e.g., face recognition, age recognition, etc.) and ensures that tasks do not conflict with each other, which enables privacy even for data of the same user.

Figure 6:
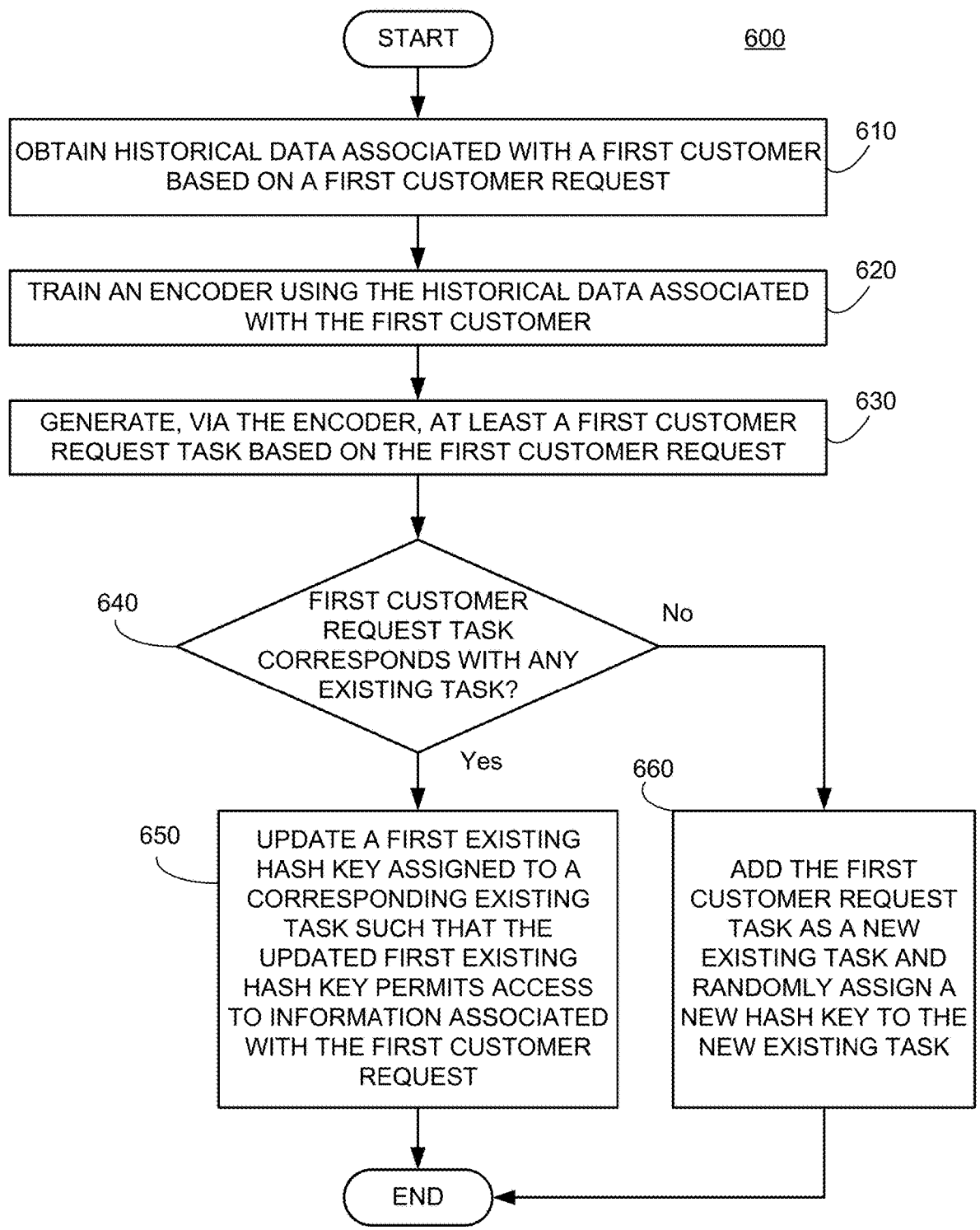
FIG. 6 is a flowchart showing operation of a second example system including a neural network using hash keys, in accordance with some embodiments.

FIG. 6 shows a flowchart of a method 600 according to an example embodiment. Method 600 may be performed by controller 110 and/or other components of computing device 100 alone or in cooperation with one or more other devices or systems. In block 610, method 600 may include obtaining historical data associated with a first customer of a plurality of customers based on a first customer request from the first customer. For example, the first customer may call a phone tech support center, initiate a chat with an online sales representative, or fill out a form at a local branch location. Alternatively, in other embodiments, the first customer may request a quote for a home loan, or ask to open an account.

In block 620, the method 600 may include training an encoder using the historical data associated with the first customer. The encoder may have a plurality of existing tasks each assigned one or more existing hash keys and each of the one or more existing hash keys may be configured to permit access to information associated with the existing task to which the respective hash key is assigned. For example, the encoder may have access to stored data from previous interactions with the first customer. The stored previous data may include saved voice samples, text samples, or form selections. Further, the existing tasks may be results from extrapolating or receiving the first customer's age, gender, location, income, marital status, and the like.

In block 630, the method 600 may include generating, via the encoder, at least a first customer request task (e.g., extrapolating the customer's age, gender, location or marital status) based on the first customer request (e.g., a request for a loan related to a selected automobile). For example, the encoder may be used to normalize the first customer request into a standardized format to form the first customer request task that can be used for comparison later in method 600. In other embodiments, the encoder may be configured to generate an entirely new first customer request task based on the first customer request.

In block 640, the method 600 may include determining, via the encoder, whether the first customer request task corresponds with any existing task of the plurality of existing tasks. For example, the encoder may determine whether a desired task, such as extrapolating the customer's age, gender, location or marital status, correlates with any existing tasks having historical data for that customer. If the result of block 640 is yes, then in block 650, the method 600 may include updating a first existing hash key assigned to the first existing task such that the updated first existing hash key permits access to information associated with the first customer request on the encoder. For example, if the encoder determines that a desired task, such as extrapolating the customer's age, gender, location, or marital status correlates with an existing and previously processed task, then the encoder may associate new data from the first customer request with historical data related to the existing task. Then, the encoder may update the hash keys associated with the existing task such that they grant access to both the new data and historical data related to the existing task. Alternatively, if the result of block 640 is no, then in block 660, the method 600 may include adding the first customer request task as a new existing task and randomly assigning a new hash key to the new existing task. The new hash key may be configured to permit access to information associated with the new existing task on the encoder.

Figure 7:
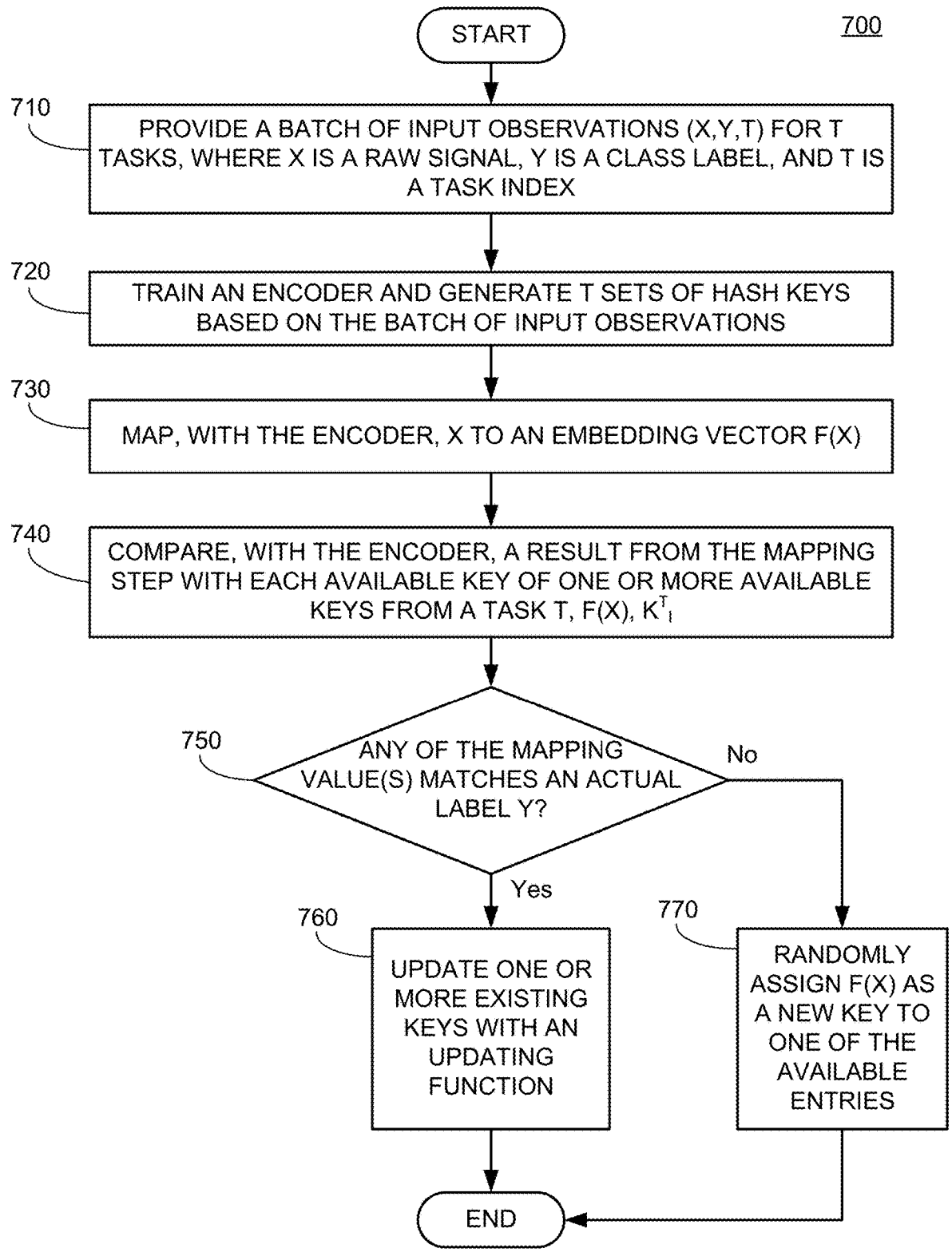
FIG. 7 is a flowchart showing operation of a third example system including a neural network using hash keys, in accordance with some embodiments.

FIG. 7 shows a flowchart of a method 700 according to an example embodiment. Method 700 may be performed by controller 110 and/or other components of computing device 100 alone or in cooperation with one or more other devices or systems. In block 710, method 700 may include providing a batch of input observations (x,y,t) for T tasks, where x is a raw signal, y is a class label, and t is a task index. For example, the batch of input observations may include data streams obtained while the customer was interfacing with a customer service system. In some embodiments, the raw signals may include voice samples, text samples, form responses, or more that were recorded about a customer as they interacted with the customer service system. The tasks included in a given batch of input observations can include any objective that is desired to be calculated by the deep learning neural network. For example, when given a set of observations about a customer, a service provider may want to extrapolate additional data, such as age, gender, location, income, marital status, and the like, about the customer. A class label may be assigned in order to group related tasks based on an overall purpose, such as tasks related to selling a customer an auto loan, or a task related to assigning a customer to a matching service representative.

In block 720, the method 700 may include training, from the batch of input observations, an encoder and T sets of hash keys. For example, customer input observations may include voice or text samples, along with information such as age, gender, location and income.

In block 730, the method 700 may include mapping, with the encoder, the raw signal x to an embedding vector f(x). For example the method may include using a collection of gradients within the embedding vector that are tweaked according to how more or less sparse of a distribution is desired.

In block 740, the method 700 may include comparing, with the encoder, a similarity of a result from the mapping step with each available hash key of one or more available hash keys from a task t, $f(x) \cdot K_i^t$. For example, when given a new batch of input observations, the system desires to find a correlation with any existing batches of input observations.

In block 750, the method 700 include determining, based on the comparison, whether any mapping value of one or more mapping values matches a hash key from an actual label y. If not (i.e., the outcome of block 750 is no), in block 760, the method 700 may include randomly assigning f(x) as a new key to one available entry of one or more available entries. For example, the neural network may keep existing and available entries as resources allow. In one embodiment, when resources are limited, the absence of an available entry may cause the system to erase the oldest entry in order to make room for one or more new entries. In another embodiment, the system may erase the least used entry to make room. In another embodiment, the system may erase the least valuable entry. In a preferred embodiment, there is no limit to resources and available entries are unlimited. Alternatively, when the encoder maps the raw signal x to the embedding vector f(x) and compares its similarity with each available key from task t, $f(x) \cdot K_i^t$, it may find a match, beyond a predetermined confidence threshold, between the new input observation and an existing key. In such a scenario (i.e., the outcome of block 750 is yes), as shown in block 770, the method 700 may include updating one or more existing keys as $$K_i^t = \frac{K_i^t + f(x)}{|K_i^t + f(x)|}.$$

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described herein with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described herein with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Exemplary Use Case

The following exemplary use case describe an example of a typical system flow pattern. They are intended solely for explanatory purposes and not in limitation. The system can provide a single neural network with hash keys connected to one or more sets of tasks, where the tasks are accessible only by their specifically assigned hash keys. A margin factor alpha (α) is used to modulate a collection of gradients that are used by the encoder's embedding function to update the neural network. The example may start when a customer dials into a call center requesting to obtain a personal loan. The system records samples of the customer's voice conversation as well as one or more requests associated with the call (e.g. to obtain the loan, open a savings account, etc.) Upon receiving the voice samples and customer requests as new input at the neural network, an encoder may map the new input using an embedding function to determine a new hash key associated with with the new input. If the new hash key corresponds with (e.g., matches beyond a predetermined confidence threshold) any hash keys associated with previous inputs, the system updates the hash keys associated with the existing inputs such that those hash keys are now associated with the new input in addition to the existing input. Otherwise, if the new hash key does not correspond with (e.g., match beyond the predetermined threshold) any hash keys associated with previous inputs, the system may assign the new hash key to the new input and stores the pair in an available entry. Further, when a third party is requested to update the neural network with respect to logic for determining age, gender, location, or income of customers based on historical data, the system designer need only provide the hash keys for a given one of the age, gender, location, or income. In this way, separate parties are not able to access logic or entries associated with unrelated and unauthorized information.

We claim:

1. A system for using hash keys to preserve privacy across multiple tasks comprising:
    one or more processors;
    memory storing instructions that, when executed by the one or more processors, are configured to cause the system to:
        provide, to an encoder, one or more training batches of input observations for one or more stored tasks, each of the one or more training batches of input observations comprising a customer request and a stored task associated with the customer request;
        assign a hash key of a plurality of hash keys to each of the one or more stored tasks;
        provide, to the encoder, a new batch of input observations comprising a new customer request and a new task associated with the new customer request;
        generate, via the encoder, a new hash key assigned to the new customer request;

determine, via the encoder, whether the new hash key assigned to the new customer request matches, beyond a predetermined confidence threshold, at least one hash key of the plurality of hash keys, wherein determining whether the new hash key matches at least one hash key of the plurality of hash keys further comprises minimizing an objective function associated with the predetermined confidence threshold; and responsive to determining that the new hash key does not match at least one hash key of the plurality of hash keys beyond the predetermined confidence threshold, generate a new stored task associated with the new batch of input observations and assign the new hash key to the new stored task to preserve privacy with respect to the new hash key;

responsive to determining that the new hash key matches at least one hash key of the plurality of hash keys beyond the predetermined confidence threshold, associating the new batch of input observations with a first training batch of input observations associated with the matched hash key, and updating the matched hash key such that the matched hash key is configured to provide access to the new batch of input observations and the first training batch of input observations.

2. The system of claim 1, further comprising instructions that, when executed by the one or more processors, are configured to cause the system to compute a sparse collection of gradients to update at least one value of the following values: at least one task of the one or more stored tasks, and at least one hash key of the plurality of hash keys.

3. The system of claim 2 further comprising instructions that, when executed by the one or more processors, are configured to cause the system to retrieve at least one hash key of the plurality of hash keys that both (1) exceeds a predetermined similarity threshold relative to the first customer request, and (2) belongs to a same stored task of the one or more stored tasks.

4. The system of claim 3 further comprising instructions that, when executed by the one or more processors, are configured to cause the system to store, using the encoder, the one or more stored tasks and the plurality of hash keys to a single neural network using the objective function.

5. The system of claim 1 further comprising instructions that, when executed by the one or more processors, are configured to cause the system to store, using a single neural network, the one or more stored tasks by assigning each task of the one or more stored tasks to independent inference units.

6. The system of claim 1, wherein the encoder comprises a convolution neural network (CNN) encoder.

7. The system of claim 1, wherein each hash key of the plurality of hash keys is normalized by calculating a square root of a sum of a plurality of squared component vector values of each hash key of the plurality of hash keys and the new hash key assigned to the new customer request is normalized by calculating a square root of a sum of a plurality of squared component vector values of the new hash key.

8. A system comprising:
one or more processors;
memory storing instructions that, when executed by the one or more processors, are configured to cause the system to:

obtain historical data associated with a first customer of a plurality of customers based on a first customer request from the first customer;

train an encoder using the historical data associated with the first customer, the encoder having a plurality of existing tasks each assigned one or more existing hash keys, and each of the one or more existing hash keys permitting access to information associated with the existing task to which the respective hash key is assigned;

generate, via the encoder, a first customer request task based on the first customer request and an associated new hash key;

determine, via the encoder, whether the first customer request task corresponds with any existing task of the plurality of existing tasks by calculating a cosine similarity between an embedding vector associated with the new hash key and the one or more existing hash keys; and when the calculated cosine similarity is less than a predetermined confidence threshold, add the first customer request task as a new existing task and randomly assign a new hash key to the new existing task, the new hash key permitting access to information associated with the new existing task on the encoder;

when the calculated cosine similarity is more than a predetermined confidence threshold, update a first existing hash key assigned to a first existing task of the existing tasks such that the updated first existing hash key permits access to information associated with the first customer request on the encoder.

9. The system of claim 8, wherein updating the first existing hash key comprises updating the first existing hash key using the embedding vector.

10. The system of claim 8 further comprising instructions that, when executed by the one or more processors, are configured to cause the system to compute a sparse collection of gradients to update at least one value of the following values: at least one task of the plurality of existing tasks, and at least one existing hash key of the one or more existing hash keys.

11. The system of claim 10 further comprising instructions that, when executed by the one or more processors, are configured to cause the system to retrieve at least one hash key of the one or more existing hash keys that both (1) exceeds a predetermined similarity threshold relative to the first customer request, and (2) belongs to a same existing task of the plurality of existing tasks.

12. The system of claim 11 further comprising instructions that, when executed by the one or more processors, are configured to cause the system to store, using the encoder, the plurality of existing tasks and the assigned one or more existing hash keys to a single neural network using an objective function.

13. The system of claim 8 further comprising instructions that, when executed by the one or more processors, are configured to cause the system to store, using a single neural network, the plurality of existing tasks by assigning each task of the plurality of existing tasks to independent inference units.

14. The system of claim 8, wherein the encoder comprises a convolution neural network (CNN) encoder.

15. The system of claim 8, wherein each hash key of the one or more existing hash keys is normalized by calculating a square root of a sum of a plurality of squared component vector values of each respective hash key of the one or more existing hash keys and the new hash key assigned to the new customer request is normalized by calculating a square root of a sum of a plurality of squared component vector values of the new hash key.

16. A method for using hash keys to preserve privacy across multiple tasks comprising:
  obtaining first customer data associated with a first customer of a plurality of customers based on a first customer request from the first customer;
  training a convolution neural network (CNN) model using the first customer data, the CNN model having a plurality of existing tasks comprising a first existing task and a second existing task and a plurality of existing hash keys comprising a first existing hash key and a second existing hash key, the first and second existing hash keys being assigned to the first and second existing tasks, respectively, and configured to permit access to stored information associated with the first and second existing tasks, respectively;
  generating, via the CNN model, at least a first customer request task based on the first customer request and an associated new hash key;
  determining, via the CNN model, whether the first customer request task matches, above a predetermined confidence threshold, any existing task of the plurality of existing tasks by calculating a cosine similarity between a first embedding vector associated with the new hash key and both the first and second existing hash keys, wherein determining whether the first customer request task matches any existing task of the plurality of existing tasks further comprises minimizing an objective function associated with the predetermined confidence threshold; and
  when the calculated cosine similarity is less than the predetermined confidence threshold, adding the first customer request task to the plurality of existing tasks and randomly generating and assigning a new hash key to the first customer request task, the new hash key permitting access to information associated with the first customer request task via the CNN model;
  when the calculated cosine similarity is more than the predetermined confidence threshold, associating the first customer request task with the first existing task such that the first existing hash key is configured to allow access to information associated with the first customer request via the CNN model.

17. The method of claim 16, wherein training the CNN model further comprises training the CNN model using the embedding vector.

18. The method of claim 16, further comprising computing a sparse collection of gradients to update at least one value of the following values: at least one task of the plurality of existing tasks, and at least one existing hash key of the one or more existing hash keys.

19. The method of claim 18, wherein the computing the sparse collection of gradients to update the at least one value further comprises:
  retrieving at least one existing hash key of the one or more existing hash keys that both (1) exhibits a threshold level of similarity with an embedding vector of the CNN model, and (2) belongs to a same existing task of the plurality of existing tasks.

20. The method of claim 19, further comprising storing, using the encoder, the plurality of existing tasks and the one or more existing hash keys to a single neural network using an objective function.

21. The method of claim 16, wherein the CNN model consists of a single neural network, the method further comprising storing, via the CNN model, the plurality of existing tasks by assigning each task of the plurality of existing tasks to independent inference units.

22. The method of claim 16 further comprising determining, via the CNN model, the predetermined confidence threshold based on the first customer request task.

23. The method of claim 16, wherein the first existing hash key and the second existing hash key are normalized by calculating a square root of a sum of a plurality of squared component vector values of the first existing hash key and the second existing hash key, respectively, and the associated new hash key is normalized by calculating a square root of a sum of a plurality of squared component vector values of the new hash key.

* * * * *